United States Patent [19]

Entenmann

[11] 4,114,760
[45] Sep. 19, 1978

[54] BAKING AND PACKAGING SYSTEM

[75] Inventor: Charles E. Entenmann, Bayshore, N.Y.

[73] Assignee: Entenmann's Bakery, Inc., Bayshore, N.Y.

[21] Appl. No.: 705,433

[22] Filed: Jul. 15, 1976

Related U.S. Application Data

[62] Division of Ser. No. 525,958, Nov. 21, 1974, Pat. No. 4,002,773.

[51] Int. Cl.² .................. B65D 57/00; B65D 85/00; B65D 5/48
[52] U.S. Cl. .................. 206/562; 206/45.19; 229/28 R
[58] Field of Search .................. 229/28, 27; 206/562, 206/563

[56] References Cited

U.S. PATENT DOCUMENTS

| | | | |
|---|---|---|---|
| 3,033,101 | 5/1962 | Meyers | 229/3.5 MF X |
| 3,189,247 | 6/1965 | Wischusen | 229/28 R |
| 3,228,518 | 1/1966 | Coby | 206/45.19 |
| 3,608,770 | 9/1971 | Naimoli | 229/3.5 MF |
| 3,722,781 | 3/1973 | Page et al. | 229/28 R |
| 3,730,419 | 5/1973 | Botterman et al. | 229/28 R |
| 3,874,548 | 4/1975 | Buff, Jr. | 229/3.5 MF X |
| 3,949,930 | 4/1976 | Giordano | 229/28 R |
| 3,994,275 | 11/1976 | Williams | 229/3.5 MF X |

*Primary Examiner*—Davis T. Moorhead
*Attorney, Agent, or Firm*—Kenyon & Kenyon, Reilly, Carr & Chapin

[57] ABSTRACT

A system for cooking and packaging bakery goods with minimum handling. Flat-folded, double-layer paperboard trays having spaced openings in the upper layer are erected and placed on a conveyor. A paper baking cup is inserted into each opening with its bottom resting on the lower layer of the tray, and a predetermined amount of batter is injected into each cup. The trays of batter-filled cups are transported to an oven for baking removed from the oven, and inserted into protective delivery and display cartons for purchase by a consumer. The tops of individual baked goods in the trays may be iced, if desired, and all steps are readily automated.

1 Claim, 6 Drawing Figures

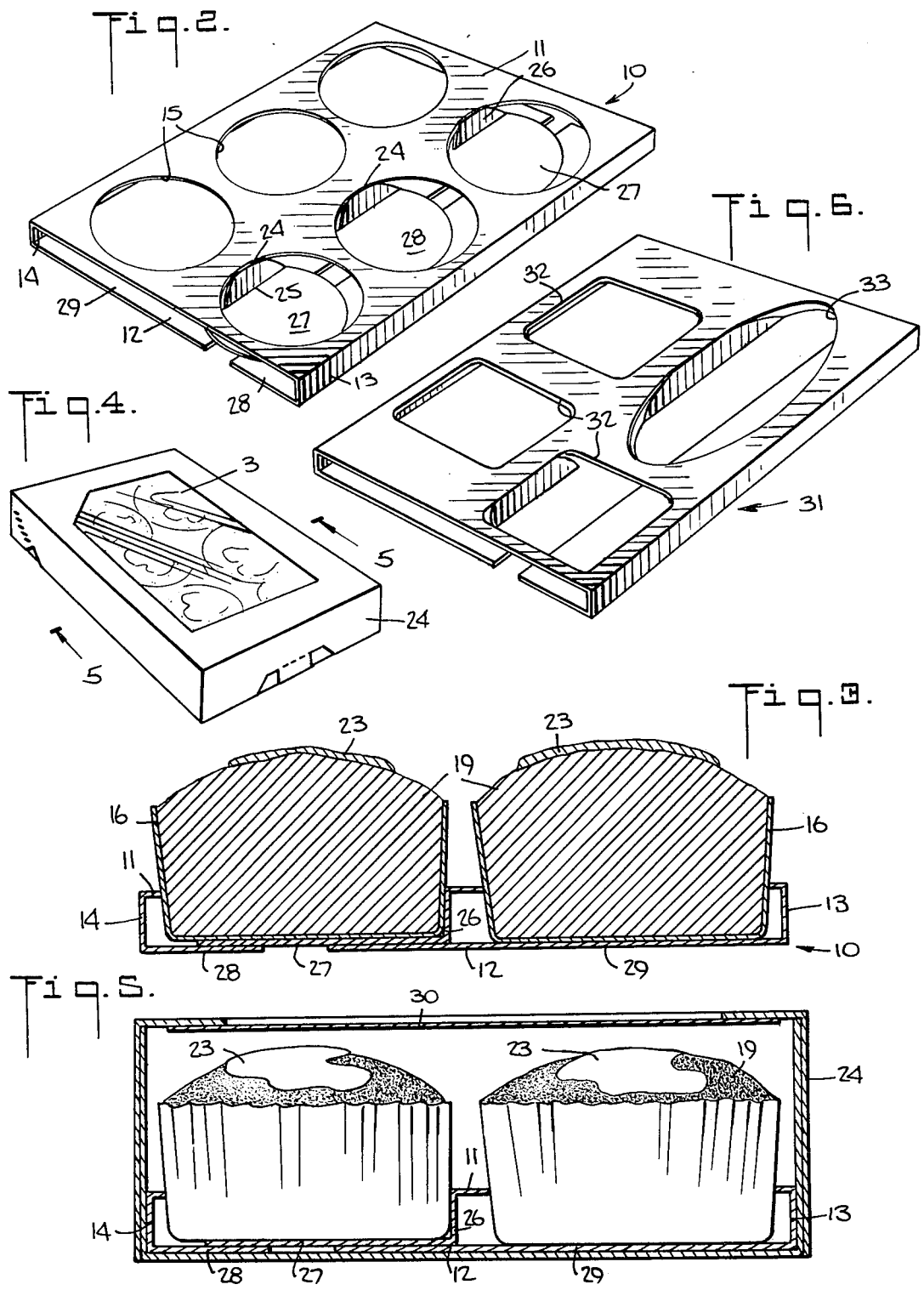

BAKING AND PACKAGING SYSTEM

This is a division of application Ser. No. 525,958 filed Nov. 21, 1974 which issued as U.S. Pat. No. 4,002,773 on Jan. 11, 1977.

BACKGROUND OF THE INVENTION

1. Field of the Invention

This invention relates to commercial food preparation and packaging and more particularly to a method for cooking and packaging bakery goods.

2. Description of the Prior Art

The conventional method for commercially baking and packaging individual bakery items such as cupcakes and muffins includes placing fluted paper liners or cups into individual molds of metal baking pans, usually having 36 molds per pan. A predetermined amount of batter is poured into each liner and the pans are placed in an oven heated to about 325° F – 350° F for baking for about 12–15 minutes. The pans are then removed from the oven and carried to racks for an allotted cooling period. After cooling the pans are taken to a moving conveyor onto which the cupcakes or muffins are dumped inspected, and iced. They are then lifted from the conveyor manually and individually placed into cartons for merchandising to the consumer.

After dumping the cupcakes or muffins, the baking pans are stacked and carried by hand to an area where they are inspected, washed, and prepared for further use.

The above process requires a high amount of labor and involves considerable handling of the individual baked goods resulting in significant rejection and undesirable exposure to contamination. It would be desirable, therefore, to eliminate individual handling of the bakery items as well as the operations involved in recycling the metal baking pans.

Other processing systems in the food handling art are described in the following U.S. patents. U.S. Pat. No. 2,761,785 to S. B. Steger shows an open-ended frozen food carton, having openings for paper cups to be filled with ice cream. The carton serves the multiple functions of a cup charging rack, a cold storage cup holder, a trade distribution carton, and a disposable retailer's display rack.

U.S. Pat. No. 3,507,668 to H. H. Bridgford discloses a boxlike, folded carton for frozen prepared dough that serves as a receptacle for the dough from its frozen storage state to its eventual baking by the consumer without removing the dough from the receptacle until it is ready to be cooled or to be eaten. The carton consists of a cardboard structure coated along the entire inner surface with a layer of aluminum foil. The cardboard may be of the solid, bleached sulphate type, the aluminum foil having a thickness of about 0.0003 inch.

U.S. Pat. Nos. 3,619,215 and No. 3,780,187 to J. C. Bard et al. and No. 2,686,129 to O. E. Selferth show "heat and serve" packaging trays for sausage or bacon. The trays are made of heavy aluminum sheet (e.g. 0.004 inch thickness) or of paperboard lined either with metal foil (e.g. aluminum foil) or heat grease resistant plastic coatings or laminates such as polycarbonates or trimethylpentene polymers.

U.S. Pat. No. 3,088,624 to C. M. Kinghorn et al. shows a tubular container made from spiral wrapped metal foil that serves as a merchandising package for items such as meat, biscuits, or the like and when unwrapped serves as a heating or baking utensil for such items. U.S. Pat. No. 3,141,400 to F. C. Powers describes an expandable metal cake pan that serves both as a merchandising container for premixed cake batter and subsequently as the baking container for use by the consumer. U.S. Pat. No. 2,271,921 J. M. Luker discloses an angel food cake package wherein the metal pan in which the cake was baked serves also as the merchandising package for sale to the consumer. U.S. Pat. No. 3,099,567 to D. H. Wallace et al. is directed to a combination food package, shipping, display and heat exchange container and serving tray for shucked oysters or other bivalves. The tray of this patent is made of heavy gauge thermoplastic material and contains an ice compartment to keep the oysters cold.

None of the above patents shows or suggests the use of a heat resistant paperboard tray having a plurality of openings for an equal number of paper baking liners as a support for said liners during successive steps of pouring batter into the liners, baking, icing and insertion into a sealable merchandising carton.

SUMMARY OF THE INVENTION

It is an object of the present invention to provide a method for cooking and packaging bakery products that requires minimum or no handling of the individual products.

It is another object of the invention to provide a method for baking simultaneously a predetermined number of bakery items and for packaging the items in a single carton without handling each item individually.

Another object of the invention is to provide an inexpensive, heat-resistant paperboard tray for use as a support and spacing means for a plurality of paper baking liners through successive steps of pouring batter, baking, icing and inserting into sealable merchandising cartons.

Still another object of the invention is to provide a method for positioning paper baking cups in a predetermined spaced arrangement on an inexpensive, heat-resistant, pasteboard tray for filling with batter, baking and installing in a final package without removing the cups from the tray.

Yet another object of the invention is to provide a method for preparing, baking, and packaging bakery products that is adapted to complete automation.

It is still another object of the invention to provide a two-level baking tray of heat resistant paperboard, the upper level having a plurality of openings for holding a corresponding number of pleated paper baking liners in spaced relation with their bottoms supported by the lower level, the distance of the upper level above the lower level being sufficient to prevent dislodgement of the liners during subsequent filling, baking and packaging operations but not so great as to allow the liner to bulge out below the upper level when filled with batter causing the cooked bakery item to become jammed in the tray.

The method of the present invention comprises generally the steps of providing double-layer trays of heat resistant paperboard, the trays having a predetermined number of spaced openings in the upper layer, positioning paper baking cups in the openings in each tray with the bottoms of the cups resting on the bottom layers of the trays, introducing a predetermined amount of batter into each cup, transporting the trays of batter-filled cups to an oven for baking at a predetermined temperature for a predetermined time sufficient to fully cook the batter, removing the trays of baked goods from the oven; inserting each tray of baked goods into a protective carton; and closing and sealing the carton ready for delivery to the consumer.

If desired, the method may include the steps of cooling the baked goods in the trays after removal from the oven and decorating the tops of the cooled goods before inserting the trays in the cartons.

As stated above, the paperboard tray should be heat resistant. Preferably its upper surface should be foil covered so that any batter or icing spills will not soak into the paperboard to cause an unsightly stain on the tray when the goods are in the merchandising display package. The foil coating may also reflect heat into the batter-filled cups for more uniform baking of the product.

In addition to being heat resistant, it is also desirable that the paperboard be formulated so as not to emit fumes when subjected to the baking process that would change the flavor of the finished product.

A preferred embodiment of the tray comprises a rectangular one-piece blank folded to form a two-layer, open-ended tray having at least one opening in the upper layer sized to snugly accept a corresponding pleated paper baking liner with its bottom supported by the lower layer of the tray. The spacing between the upper and lower layers is sufficient to prevent dislodgment of the liner during subsequent steps of filling, baking and packaging but not so high that the liner will bulge below the upper layer when filled with batter and cause the subsequently baked item to become jammed in the tray and difficult to remove without damage. The optimum height of the upper layer above the lower layer is about three-fourths inch for most applications.

The above and other features and objects of the invention will be more fully explained in connection with the preferred embodiments illustrated in the accompanying drawings.

BRIEF DESCRIPTION OF THE DRAWINGS

FIG. 2 is a perspective view of one embodiment of a fold-up tray for practicing the method of the invention.

FIG. 3 is a cross section of cup cakes in paper liners in a pasteboard tray taken along lines 3—3 of FIG. 1.

FIG. 4 is a perspective view of a final package of baked goods resulting from the method of the invention.

FIG. 5 is a cross section of the sealed package of baked goods taken along lines 5—5 of FIG. 4.

FIG. 6 is a perspective view of an alternate arrangement of a fold-up tray for practicing the method of the invention.

DESCRIPTION OF THE PREFERRED EMBODIMENTS

Figure 1:
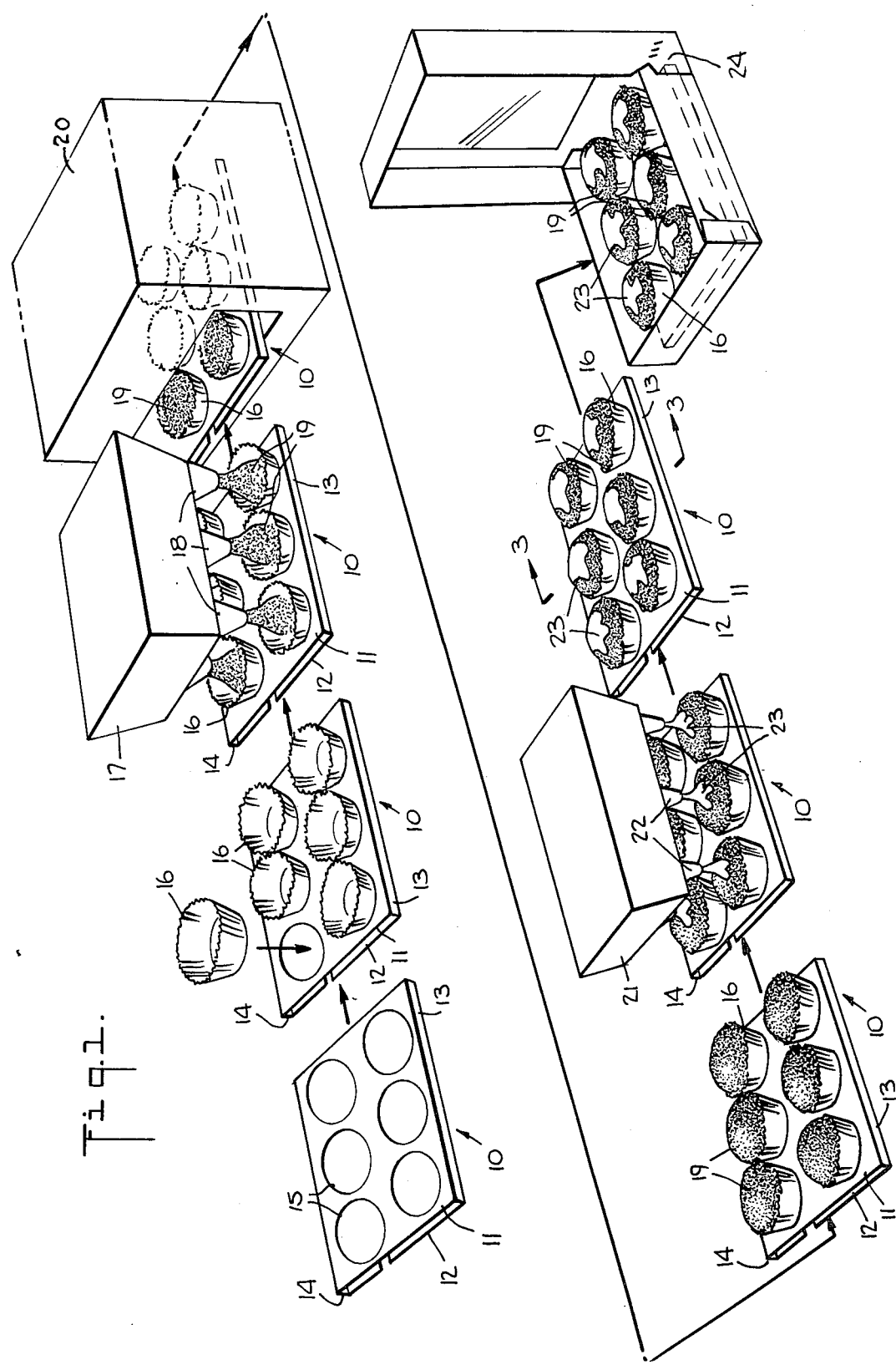
FIG. 1 is a step-by-step simplified illustration of the baking and packaging method of the invention.

The steps of the preferred method of the invention are illustrated in FIG. 1, continuing in sequence from upper left to lower right. In the first step, a two-layer paperboard tray 10 has been erected from a flat-folded blank and placed at a first station on a flat conveyor of conventional design (not shown to avoid unnecessary detail). The tray is folded from a single piece of paperboard to form an upper layer 11, a lower layer 12 and two sides 13 and 14. The plurality of openings 15 are punched through the upper layer in predetermined spaced relation, depending on the number, size and shape of bakery items desired for a single merchandising package. Tray 10, for example, has six openings and is suitable for a package of half a dozen cupcakes or muffins.

The tray is then transported by the conveyor to a second station where pleated paper baking cups or liners 16 are inserted through the openings in the upper layer of the tray, one cup per opening, so that the bottoms of the cups rest on the lower layer of the tray. The liners are the same as those used in the conventional baking process with metal pans and are made preferably of 30 lb. test solid bleached sulphate grease-proof paper. The paper liners can be either plain or foil-laminated, if desired. Typical foil thickness is approximately 0.0003 inch, and the foil is applied to the outside surface of the liner only.

After the liners are positioned in the openings, the tray advances to a third station underneath a reservoir 17 filled with batter and having a plurality of delivery spouts 18 equal in number and spacing to the liners in the tray. A predetermined amount of batter 19 is delivered simultaneously from each spout to the corresponding baking cup beneath it, and the tray of batter-filled cups than proceeds to an oven 20 where the batter is baked for a predetermined time at a predetermined temperature. For cupcakes the baking time may be typically 12 to 15 minutes at 325° F to 350° F.

Following the baking step, the tray with the now fully cooked cupcakes is transported from the oven to a cooling station for a predetermined time. Then the tray moves to a sixth station underneath another reservoir 21 containing icing and also equipped with a plurality of spouts 22. Spouts 22 are equal in number and spacing to the cupcakes on the tray, and a predetermined amount of icing is deposited simultaneously on the top of each cupcake when the tray is positioned under reservoir 21. After icing, the tray of completed cupcakes moves to a loading station where the cupcakes may be inspected, and then the full tray is inserted into a delivery and display carton 24, which is then closed and sealed ready for purchase by a consumer.

The foregoing description demonstrates that the method of using a paperboard tray to serve as a carrier for a plurality of baked goods for the entire process from the pouring of the batter through baking, cooling, decorating, inspecting and final packaging reduces significantly the amount of hand labor required. In particular, the need for removing individual baked items from the previous metal baking pans and for handling the items individually through the inspecting, icing and packaging steps has been eliminated. Also eliminated, of course, is the entire cycle of operations performed on the pans themselves (i.e. stacking, washing, inspecting, etc.).

Furthermore, the method of the present invention is particularly adapted to completely automated production. In such an operation, cases of flat-folded trays are delivered to the feed hopper of a setup machine that automatically erects the trays and places them on a conveyor. Another machine then inserts the liners into each tray, the trays move forward at a predetermined rate to an automatic batter pouring station, and the filled trays then enter an oven sized to provide sufficient baking time in relation to the conveyor rate. The icing step is also automated in the same manner as the batter pouring step, and the trays are inserted automatically into cartons that have been set up from a flat blank by an automatic forming machine. A final machine then closes and seals the box for complete protection.

The batter and icing stations have been described as delivering from a single reservoir simultaneously to all cups on a tray. Since the conveyor line speed will normally be limited by the oven size, it will usually be sufficient to have a single row of batter and icing spouts arranged transversely to the line of travel of the conveyor. If desired, each spout can be fed from a separate reservoir so that different flavors of batter and icing can be provided for cupcakes in a single package.

FIGS. 2 and 3 illustrate one form of tray made from a single rectangular paperboard blank. In this example the blank is first punched with two columns of three openings extending parallel to the short sides of the blank, with the center line between the columns displaced to one side of the center of the long dimension of the blank. One column of openings is punched clean and the other column, closest to the end of the blank is punched only partially. The circular tabs of partially punched openings are scored for folding on two parallel lines, one fold downward on line 24 at the connection of the tab to the blank and the second fold on line 25 at distance equal to the intended height of the erected blank, the two folds separating each tab into a wall portion 26 and a base portion 27.

The blank is also scored for four fold lines to form the upper layer 11, the two sides 13 and 14, and the lower layer 12. As shown in the figures, lower layer 12 is composed of a short end flap 28 and a longer end flap 29. The upper faces (when folded) of the two end flaps are then glued to the under surfaces of the base portions 28 of each circular tab. The finished trays can be folded flat for shipment and easily erected for use. When erected, the wall portions 26 of the circular tabs act as central partitions to provide increased stiffness to the tray.

If unsupported, the pleated wall of a typical baking liner will tend to bulge outward in a region slightly above the bottom of the liner when it is filled with fluid batter as a result of the hydrostatic pressure exerted by the batter. An important feature of the double-layer tray disclosed herein is that the upper layer is spaced above the layer at a height predetermined to provide maximum support to the liner walls, as shown in FIG. 3. The optimum spacing is about three-fourths inch for most baking applications, although it may be increased for particularly large items such as a pound cake, for example. It is important that the height of the upper layer of the tray above the lower layer be so great that the liners will bulge out in the space between the layers, making it difficult for the consumer to remove the bakery items from the tray without damage to the baked goods.

A preferred material for the trays is 0.018 inch solid bleached sulfate board weighing approximately 67 pounds per thousand square feet and containing approximately 20 percent titanium dioxide pigment for brightness. The top liner of the board is clay coated to resist grease stains; the bottom liner, which forms the inside surface of the finished tray, can be untreated.

As mentioned earlier, the outer surface of the tray may have a foil lamination (preferably 0.0003 inch thick) attached by a suitable adhesive, such as Bordens LB-4340. The foil produces an attractive shiny surface that is not stained by drops or spills of batter or icing.

An important feature of the above type of paperboard is that it resists temperatures as high as 400° F for at least the usual baking times without chemically degrading or changing color.

FIGS. 4 and 5 illustrate the appearance of the tray of cupcakes in the final sealed package, which normally will have a transparent window 30 in the top of the box to facilitate consumer choice. The importance of having an attractive, fresh-looking tray for the goods can thus be fully appreciated. As shown in FIG. 5, the tray should be sized to fit snugly within the box, thereby contributing the additional advantage of protecting the contents from shifting and consequent damage.

Referring to FIG. 6, one can see that still another advantage of using an inexpensive paperboard tray for both baking and packaging bakery items is that a wide variety of shapes and sizes is possible without the expense of a large inventory of special types of metal baking pans. In FIG. 6 a two-layer tray 31 of the same type as shown in FIG. 2 has one column of two square openings 32 and a second column of one square opening 32 and one oval opening 33. The potential for novel and interesting merchandising assortments is literally endless. In addition, the method is adaptable for use with individual bakery items weighing from 1 ounce to one pound, or even more if desired.

The type of tray illustrated in the drawings is preferred because it folds flat to take up minimum storage space prior to use and because it provides maximum access for the heated air in the oven to contact and circulate around the baking liners for uniform heat transfer to the batter. The method can also be practiced using trays of suitable molded heat resistant sheet plastic or paper material having spaced indentations of the proper size and shape for supporting corresponding baking liners.

I claim:

1. A system for packaging bakery items comprising:
   a shallow tray of heat resistant paperboard including
      an upper planar portion having a plurality of spaced openings of predetermined size and shape, said upper planar portion constituting the uppermost portion of the tray,
      a lower planar portion extending under the openings in the upper planar portion, and
      integral means for connecting the upper planar portion in spaced relation above the lower planar portion;
   a plurality of pleated paper baking liners fitting within the openings in the upper tray, one liner in each opening with the bottom of the liner being supported by the lower planar portion of the tray and the side wall of the liner being supported against bulging outward when filled with batter by the edges of the corresponding opening in the upper planar portion of the tray engaging the side wall of the liner in substantially the central portion thereof; and
   a covering for the tray and liners to seal the contents of the liners from contamination during delivery and display of the bakery items, the covering comprising a rectangular paperboard carton having a top, four sides, and a bottom, the size of the tray being predetermined to fit snugly within the four sides of the carton to prevent shifting of the contents of the liners with possible damage to said contents.

* * * * *

UNITED STATES PATENT AND TRADEMARK OFFICE
CERTIFICATE OF CORRECTION

PATENT NO. : 4,114,760
DATED : 19 September 1978
INVENTOR(S) : Charles E. Entenmann It is certified that error appears in the above-identified patent and that said Letters Patent are hereby corrected as shown below:

In the Abstract, line 8: after "baking" insert --,--.

Column 1, line 24: after "dumped" insert --,--.

Column 1, line 61: after "heat" insert --and--.

Column 2, line 5: after "2,271,921" insert --to--.

Column 4, line 23: change "than" to --then--.

Column 5, line 22: before "distance" insert --a--.

Signed and Sealed this

Twenty-third Day of January 1979

[SEAL]

Attest:

RUTH C. MASON
Attesting Officer

DONALD W. BANNER
Commissioner of Patents and Trademarks